March 10, 1953
E. S. MARIOTTE
2,630,909
BAR STOCK FEEDING MECHANISM
Filed April 4, 1946
4 Sheets-Sheet 1
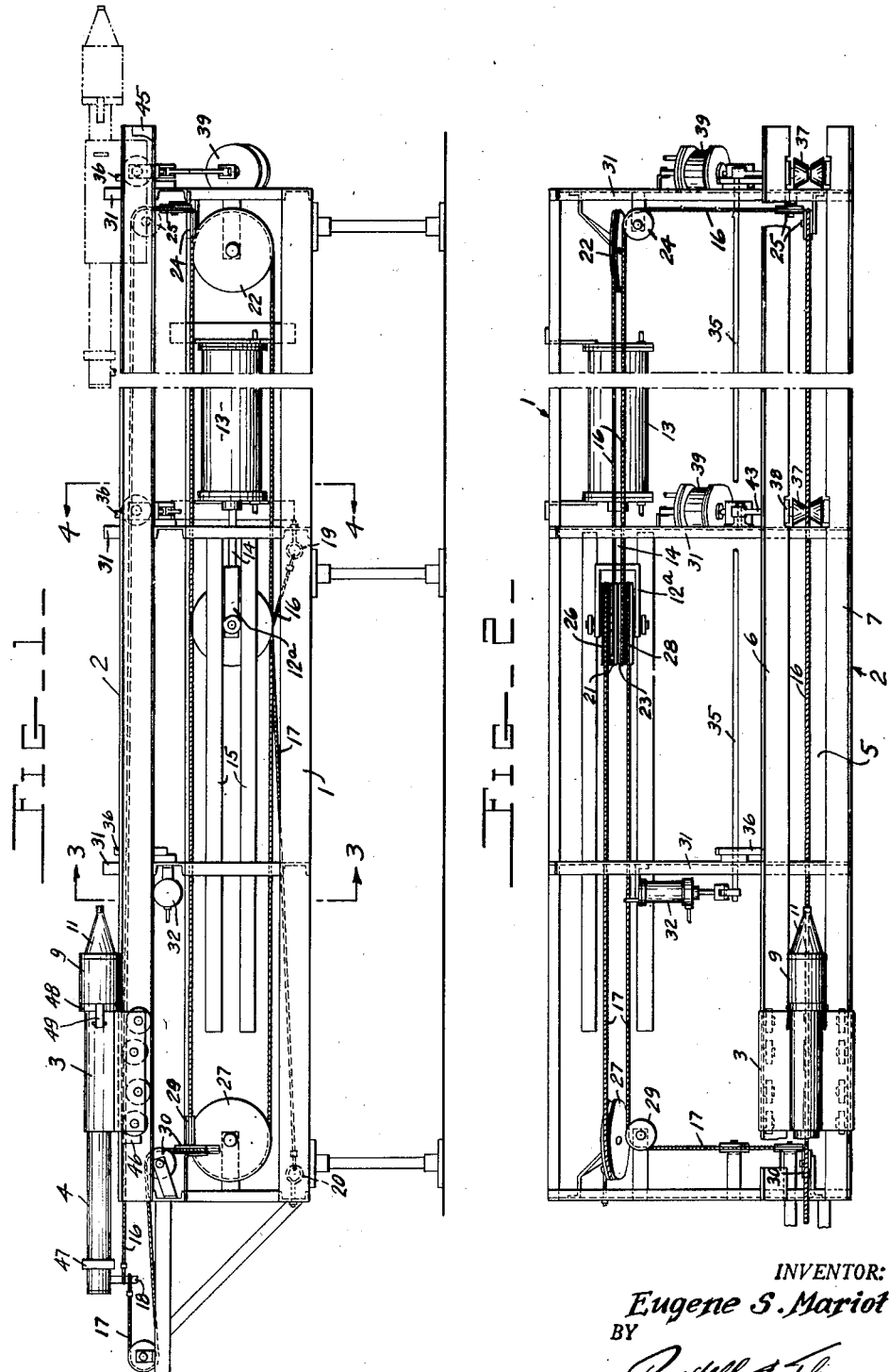
INVENTOR:
Eugene S. Mariotte,
BY
Boddl & Thompson
ATTORNEYS.

March 10, 1953  E. S. MARIOTTE  2,630,909
BAR STOCK FEEDING MECHANISM
Filed April 4, 1946  4 Sheets-Sheet 2

INVENTOR.
Eugene S. Mariotte,
BY
Bodell & Thompson
ATTORNEYS.

March 10, 1953 E. S. MARIOTTE 2,630,909
BAR STOCK FEEDING MECHANISM
Filed April 4, 1946 4 Sheets-Sheet 3
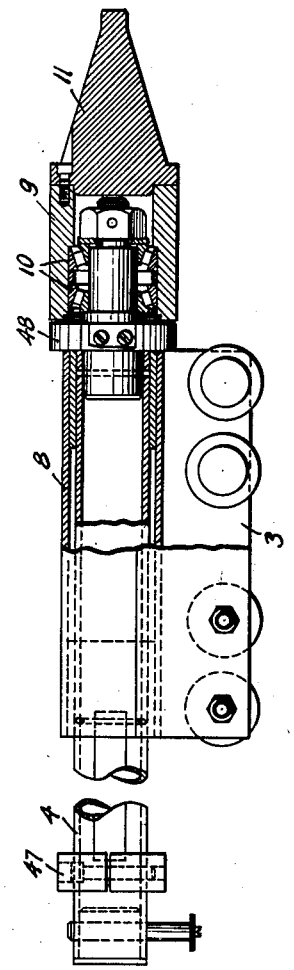
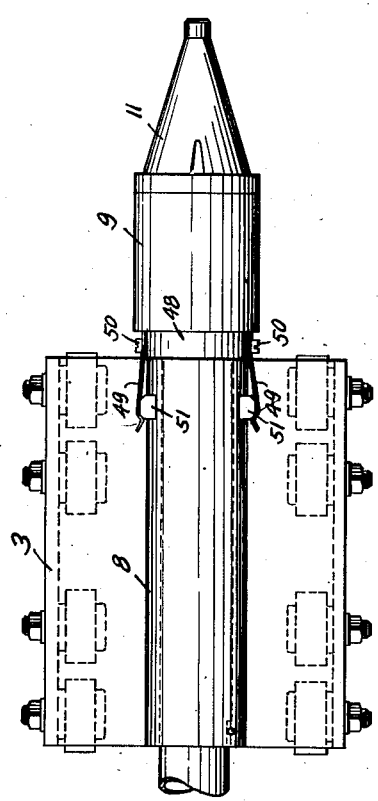
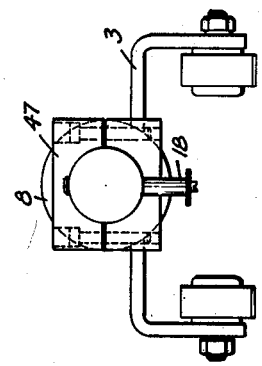
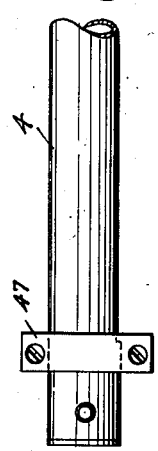
INVENTOR.
Eugene S. Mariotte,
BY
Boltell & Thompson
ATTORNEYS.

March 10, 1953 E. S. MARIOTTE 2,630,909
BAR STOCK FEEDING MECHANISM
Filed April 4, 1946 4 Sheets-Sheet 4
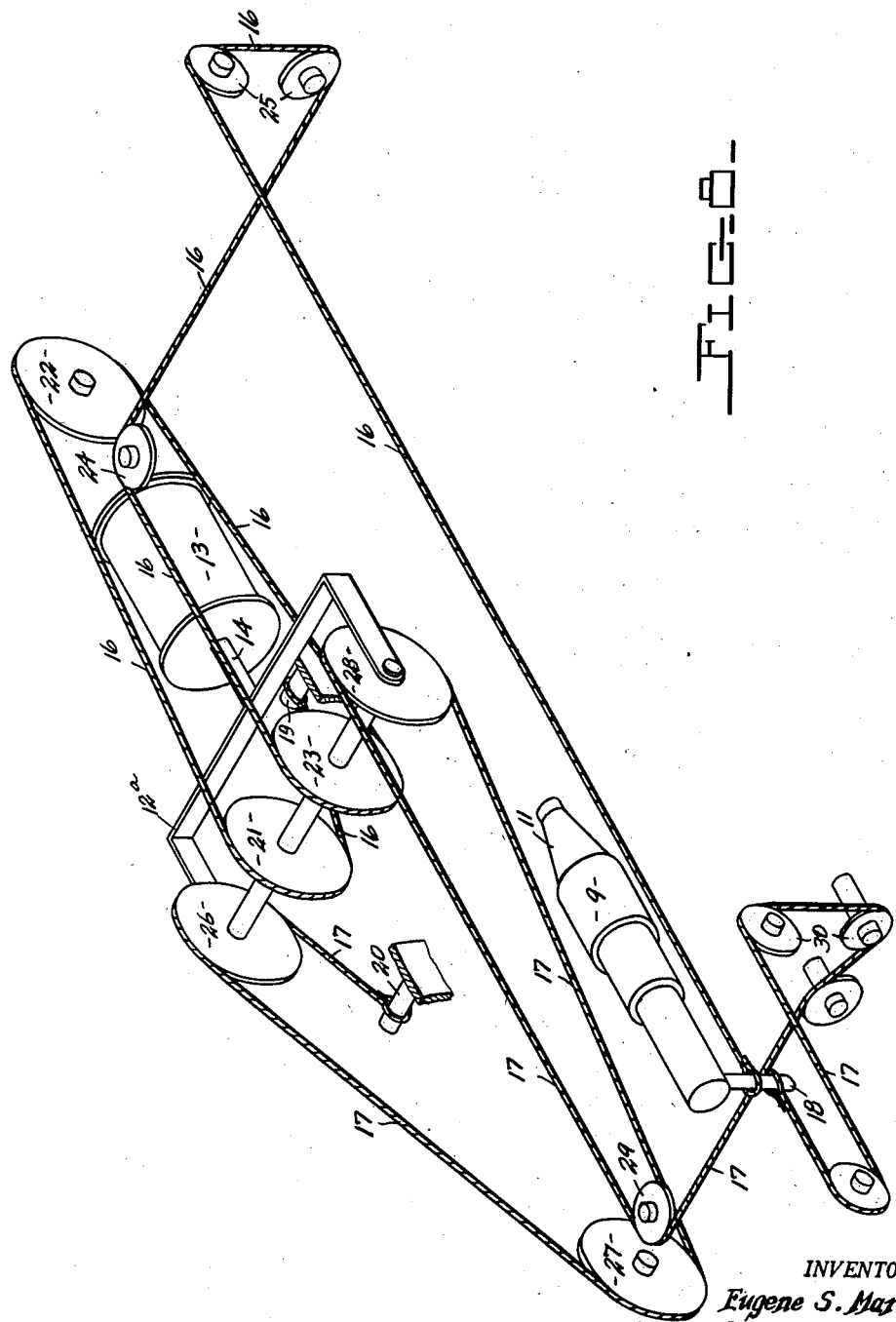
INVENTOR:
Eugene S. Mariotte,
BY
Jodell & Thompson
ATTORNEYS.

Patented Mar. 10, 1953

2,630,909

UNITED STATES PATENT OFFICE 2,630,909

BAR STOCK FEEDING MECHANISM

Eugene S. Mariotte, Syracuse, N. Y., assignor to Lipe-Rollway Corporation, Syracuse, N. Y., a corporation of New York Application April 4, 1946, Serial No. 659,552

4 Claims. (Cl. 198—221)

This invention relates to bar stock feeding mechanism for automatic metal working machines, that is, for feeding the bars through the rotating spindle of the machine a predetermined distance against the stop of the machine, upon each feeding movement, into position where the tools of the machine form an article from the end of the bar projecting beyond the end of the spindle and cut off the finished article. The operation of the metal working machine forms no part of the invention.

The invention has for its object a bar feed mechanism particularly for feeding bars of relatively large diameter, as for instance, bars of four inch diameter. The bars may be solid but are oftentimes tubular.

More specifically, the invention has for its object an arrangement of a track for a carriage on which is mounted a plunger for feeding the bar, the plunger having a feeding movement relatively to the carriage when the carriage moves to the limit of its movement, to additionally feed the bar, so that there is but a short remnant of the bar left when the bar becomes too short to form an additional article therefrom. It also has for its object an arrangement of the carriage and a magazine for the bars, whereby the bars are fed onto or over the track in front of the push plunger piston, and means for raising the bar slightly off the track for the feeding operation. It also has for its object means for moving the plunger and its carriage along its track including a reversely movable actuator and motion transmitting means between it and the plunger to feed the plunger during movement of the actuator in one direction and to withdraw the plunger during the movement of the actuator in the opposite direction.

The invention consists in the novel features and in the combinations and constructions hereinafter set forth and claimed.

In describing this invention, reference is had to the accompanying drawings in which like characters designate corresponding parts in all the views.

Figure 1 is a side elevation of one embodiment of this bar feed.

Figure 2 is a plan view of parts seen in Figure 1.

Figure 5 is an elevation on an enlarged scale, partly broken away and partly in section, of the carriage and feed plunger.

Figure 6 is a plan view of parts seen in Figure 5.

Figure 7 is an end elevation looking to the right in Figure 5.

Figure 8 is a diagrammatic, isometric view of the reciprocating actuator and runs of cables between it and the bar feed plunger to actuate the plunger in opposite directions.

Figure 4:
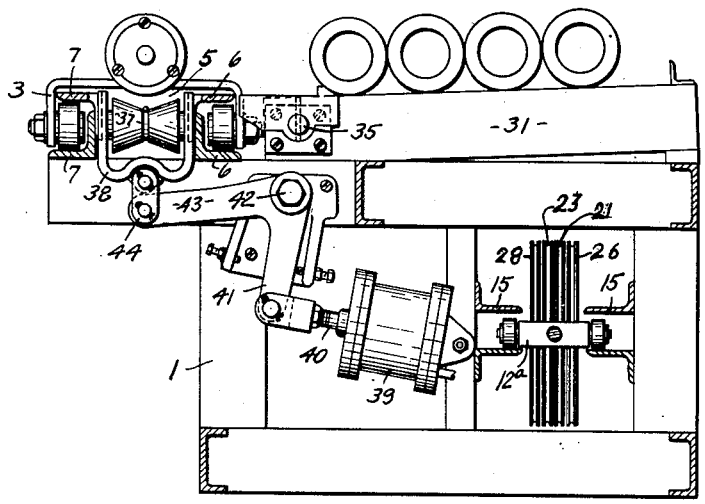
Figure 4 is a sectional view taken on the plane of line 4—4, Figure 1.

The frame 1 may be of any suitable form, size and construction. 2 designates, generally, the track extending lengthwise of the frame at the top thereof. 3 designates the carriage movable along the track, and 4 the push plunger mounted on the carriage. The track, as seen in Figures 2 and 4, is formed with a lengthwise slot 5 located substantially centrally thereof. As here illustrated, the track is formed up of channel or angle irons 6, 7 arranged to form outwardly facing channels. The bars 6, 7 are spaced apart to provide the slot 5.

The carriage 3, as seen in Figure 4, is mounted astride the track 2, extends across the slot 5 and is provided, as seen in Figure 5, with a tubular guide portion 8 in which the plunger 4 slides. The carriage is also provided with antifriction members located in the outwardly facing channels of the track and so arranged, as seen in Figure 1, that some of the rollers engage the upper side walls of the channel formation, and others the lower side walls.

The plunger 4, as here shown, includes a body or stem slidably mounted in the guide 8 of the carriage and a head 9 rotatably mounted on the advance end of the stem through antifriction bearings 10. The head is here shown as formed with a conical end-piece 11 for the purpose of entering into the end of a tubular bar. When a solid bar is being operated on, an end-piece formed with a conical socket is used, as is well understood.

12 designates a power-operated, reversely-movable actuator. The prime mover is here shown as a double acting cylinder and piston motor 13, the piston rod 14 of which is connected directly to the actuator 12ª. The actuator is reciprocally movable along suitable guides 15. As here shown, this actuator is a tackle block carrying pulleys over which run the cables of a block and tackle system. 16 and 17 designate the cables respectively, these being connected to the plunger 4 as to a lug 18 thereon, to exert a pulling force in opposite directions on the plunger 4, in accordance with the direction of movement of the tackle block 12ª along its guide 15. The cable 16 exerts a forward or feeding pulling force when the tackle block moves in one direction and idles or runs slack when the pulling force is applied by the cable 17 in the opposite direction, and likewise, the cable 17 exerts the pulling force during movement of the tackle block in the opposite direction at which time the cable 16 is merely following up. The cables 16 and 17 are anchored respectively at 19 and 20 at their ends remote from their point of connection to the lug 18. The cable 16 passes from its anchor point 19 around pulley 21 on the tackle block 12, thence over stationary pulley 22 mounted on the frame, thence around pulley 23 of the tackle block, thence around pulleys 24 and 25 to the lug 18. The other cable 17 passes from its anchor point 20 around pulley 26 of the tackle block, thence around stationary pulley 27 fixed to the frame, thence around pulley 28 of the tackle block and pulleys 29 and 30 to the lug 18 of the plunger.

Figure 3:
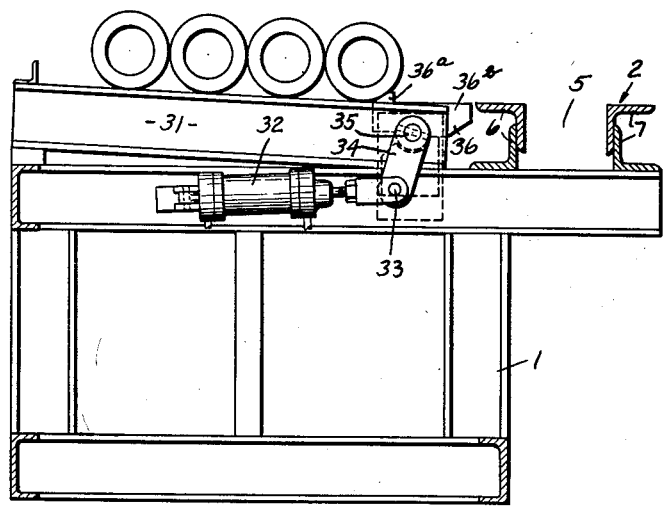
Figure 3 is an enlarged sectional view taken on the plane of line 3—3, Figure 1.

The magazine for feeding the bars to the track in position to be pushed by the plunger 4 when it is in retracted position is here shown as in the form of transverse track bars 31 forming part of the frame, and inclined but slightly out of the horizontal toward the track 2, which is located at one side of the frame. The feeding movement of the bars from the track is controlled by duplicate escapements, as will be presently described, and the bars are so arranged relatively to the upper face of the track that the bars roll onto the track and initially rest on the track in front of the plunger or on rollers associated with the track. The escapements may be of any suitable construction. They are here shown as spaced apart along the track and actuated by a cylinder and piston motor 32, the piston rod of which is connected at 33 (see Figure 3) to a rock arm 34 which is mounted on a rock shaft 35 common to all the escapements. Each of the escapements includes a rocking member 36 mounted between its ends on the shaft 35 to rock therewith and having a shoulder 36ª at one end normally arranged in the path of the foremost stock bar in the magazine and bridge portion 36ᵇ to bridge the space between the magazine track bars and the side of the track 2. Upon each operation of the motor 32, that is, each reciprocation of its piston, the shoulder 36ª moves out of position to block the foremost stock bar so that it rolls onto the bridge 36ᵇ which is rocked to an inclined position in the opposite direction, and upon the reverse movement of the piston, which immediately follows, the shoulder 36ª moves back into position to block the next stock bar as it rolls down the magazine, while the bridge is rocked to a horizontal position, allowing the stock bar to be rolled onto the track 2 and into the slot 5. In other words, this is merely a cut-off escapement for permitting one bar to escape at a time during each reciprocation of the piston of the motor 32.

Means are provided for lifting the bar into alinement with the plunger 4. As here shown, this includes a plurality of rests or rollers 37 associated with the track 2 and spaced apart at intervals. The rollers 37 are mounted in carriers 38 movable vertically in the slot 5 or between the channel forming bars 6, 7 constituting the track 2. The carriers are movable vertically, as by a cylinder and piston motor 39, the piston rod 40 of which is connected through suitable motion transmitting means to the carriers 38. This motion transmitting means consists of an angle lever 41 mounted on a rock shaft 42. There is one angle lever 41 and each of the levers includes a single arm, as the arm 43, of the angle lever. Each arm 43 is connected through a link 44 to the adjacent carrier 38. The operation of the piston in the cylinder is so timed that it is reversed to lower the carriers 38 for the rollers 37, when the bar is held between head 11 of the plunger at one end and the spindle of the machine at the other end in a manner similar to that shown in Mariotte Patent No. 2,327,916, dated April 24, 1943.

The timing of the operation or energization of the cylinders 13, 32 and 39 forms no part of this invention.

The motion of the carriage 3 along the track 2 is limited in opposite directions, as by stops 45, 46. In order that the remnant of the bar may be of minimum length, the plunger 4 has an axial shifting movement relative to the carriage 3 or the guide 8 thereof. This relative movement is limited by stops 47 and 48 respectively on the plunger to engage opposite ends of the carriage or the tubular portion 8 thereof. In order that the carriage and the plunger 4 may move as a unit until the carriage is stopped in one or forward direction, and in order that it may then move relative to the carriage, when the carriage is stopped in the opposite or retrograde direction, an automatically releasable and engageable coupling is provided between the plunger and the carriage. This coupling is shown as a friction latch. It is here shown as consisting of spring-pressed fingers or arms 49 anchored at 50 to the body or stem of the plunger 4 or to the stop 48 thereon and coacting with a spring latch action with cam shaped shoulders 51 on the carriage. The free ends of the arms 49 and the shoulders 51 are so shaped as to coact with a camming action, and hence release, during the feeding movement, when the carriage 3 comes up against the stop 45 and the force continues to be applied to the plunger 4 by the cable 16. During the reverse movement of the carriage, the plunger is moved in the opposite direction relatively to the carriage, and the latch re-engages at the latest after the carriage encounters its stop 46. Due to the pull of the cable 16 on the plunger 4, the carriage 3 is moved to the right as a unit with the plunger due to the coupling or spring pressed latch fingers 49. When the carriage encounters the stop 45, continued pulling force applied to the cable 16 overcomes the latching force of the fingers 49 and moves the plunger 4 axially relative to the carriage, Figure 1, so that the plunger feeds the remnant of the bar into the rotating spindle of the machine tool to a maximum extent when the bar is free to be shifted, as when the collet or chuck of the machine tool is open. During retrograde movement of the plunger 4 under the pull of the cable 17 to the left, the plunger 4 shifts axially to the left, Figure 1, relative to the carriage 3, and the fingers 49 latch into engagement with the cam shoulders 51 not later than when the carriage 3 encounters the stop 46.

In operation, assuming that the actuator or tackle block is in its starting or retracted position, and also that the plunger 4 is in its retracted position, a suitable control valve for the cylinder 32 is operated to cause escapement mechanism to make one operation, permitting the foremost stock bar to roll down the magazine track 31 into the slot 5 of the track 2, and then return to its normal position to block further rolling of the next bar. The control valve is then operated to permit air to enter the cylinder 39 to move its piston rod 40 to the left (Figure 4) and cause the carriage 38 to lift the rollers 37 to raise the stock bar upwardly wholly out of the slot 5. By a suitable control valve, air is then permitted to enter the right hand end (Figure 1) of the cylinder 13, which, through the block and tackle motion transmitting mechanism, causes the plunger 4 to push the stock bar to the right through the spindle of the metal working machine and up against the stop of the metal working machine. When the article being formed from the end portion of the bar between the spindle or the chuck thereon and the stop of the metal working machine is finished and cut off from the bar, the piston in the cylinder 13 again operates to again feed the bar. This operation is repeated until but a short remnant of the bar remains during this feeding operation. The cylinder 13 is constantly under pressure to actuate its piston and the tackle block 12 to the left. When the carriage 3, which carries the plunger 4, engages the right hand stop 45, the plunger 4 continues to feed as the force tending to feed the plunger overcomes the holding force of the coupling 49, permitting the plunger and bar to feed until the stop 47 engages the carriage.

The control for the cylinder 13 is then operated to reverse the flow of air to the cylinder 13, so that the tackle block is pulled to the right and through the block and tackle motion transmitting mechanism including the cable 17, exerts a pulling force to the left (Figure 1) on the plunger 4, and in one movement compared with the step by step feeding movement to the right, retracts the plunger and the carriage 3 to its extreme left hand position (Figure 1). During the retracting operation, and not later than when the carriage 3 encounters its stop 46, the piston 4 is moved from its extended position, wherein the head 9 is uncoupled from the carriage 3, back to normal position, where the friction clutch means 49 re-engages in the position shown in Figures 1 and 6. These operations are then repeated on a new bar which is fed in from the magazine, as before described.

What I claim is:

1. A bar stock feeding mechanism for metal working machines including a frame formed with a track, a carriage movable along the track, a push plunger mounted on the carriage to move therewith for pushing endwise against the bar to feed the same, the track having means for supporting the bar, power means for actuating the plunger including a reversely movable actuator, and motion transmitting means between the actuator and the plunger to move the same forwardly to feed the bar when the actuator moves in one direction and retrogradely when the actuator moves in the opposite direction, stops located to limit the movement of the carriage in opposite directions, the plunger being slidably mounted in the carriage, an automatically releasable and engageable coupling between the plunger and the carriage operating to normally hold the plunger and the carriage to shift as a unit and to uncouple when the actuating force applied to the plunger overcomes the holding of the coupling when the carriage is stopped in the feeding direction of the bar and to couple when the carriage is stopped during its retrograde movement.

2. A bar stock feed mechanism for metal working machines including a frame formed with a track, a carriage movable along the track, a push plunger mountable on the carriage to move therewith for pushing endwise against the bar to feed the same, the track having means for supporting the bar, power means for actuating the plunger including a reversely movable actuator, block and tackle means between the actuator and the plunger including a tackle block movable with the actuator, cables running over pulleys on the tackle block to pass around the same in opposite directions and anchored at like ends to the frame and at their other ends to the plunger to pull thereon in opposite directions, the cables running over guide pulleys between the tackle block and the plunger arranged so that pulling force is applied to one of the cables when the actuator is moving in one direction and to the other cable when the actuator is moving in the opposite direction, the plunger being slidably mounted in the carriage, and a releasable friction coupling between the plunger and the carriage operating to normally hold the plunger and carriage to shift as a unit and to uncouple when the feeding force applied to the plunger overcomes the holding force of the coupling when the movement of the carriage is stopped in the feeding direction of the bar.

3. A bar stock feeding mechanism for metal working machines including a frame formed with a track, a carriage movable along the track, a push plunger including a stem mounted on the carriage to move therewith, a head rotatably mounted on the end of the stem for coacting with the bar, stops for limiting the movement of the carriage, the push plunger being mounted to move axially relatively to the carriage, and an automatically releasable and engageable coupling between the plunger and the carriage operable to release and permit continued advance of the plunger when the carriage encounters one stop and to permit continued movement of the plunger and effect re-engagement of the coupling when the carriage encounters the other stop.

4. A bar feed mechanism for metal working machines which include a frame formed with a guide, a push plunger mounted to push the bars endwise to feed the same into the machine, a reciprocally movable carriage for the plunger, power means for actuating the carriage and the plunger in one direction to feed the bar to the machine, and in the opposite direction to retract the plunger to starting position, the feed mechanism being characterized by stops located to limit the movement of the carriage, an automatically releasable and engageable coupling between the plunger and the carriage operating to normally hold the plunger and the carriage to shift as a unit and to uncouple when the actuating force applied to the plunger overcomes the holding of the coupling when the carriage is stopped in the feeding direction of the bar and to couple when the carriage is stopped during its retrograde movement.

EUGENE S. MARIOTTE.

REFERENCES CITED

The following references are of record in the file of this patent:

UNITED STATES PATENTS

| Number | Name | Date |
|---|---|---|
| 324,409 | Nutting | Aug. 18, 1885 |
| 497,706 | Chase et al. | May 16, 1893 |
| 981,268 | Hurd | Jan. 10, 1911 |
| 1,084,042 | Sessions | Jan. 13, 1914 |
| 1,861,113 | Coberly | May 31, 1932 |
| 2,108,274 | Tautz et al. | Feb. 15, 1938 |
| 2,156,204 | Stolze | Apr. 25, 1939 |
| 2,165,912 | Whitman | July 11, 1939 |
| 2,166,608 | Postlewaite | July 18, 1939 |
| 2,289,140 | Mohan | July 7, 1942 |
| 2,339,712 | Mariotte | Jan. 18, 1944 |
| 2,345,207 | Mansfield | Mar. 28, 1944 |
| 2,426,095 | Hecker | Aug. 19, 1947 |